Dec. 1, 1925.
F. G. BRISTOW
1,563,332
ADAPTER FOR SHEEP SHEARS
Filed Nov. 1, 1924     2 Sheets-Sheet 1
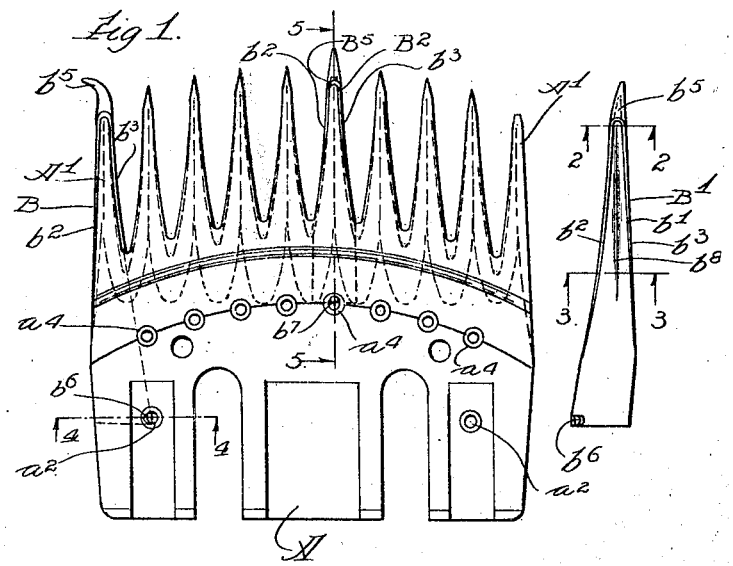
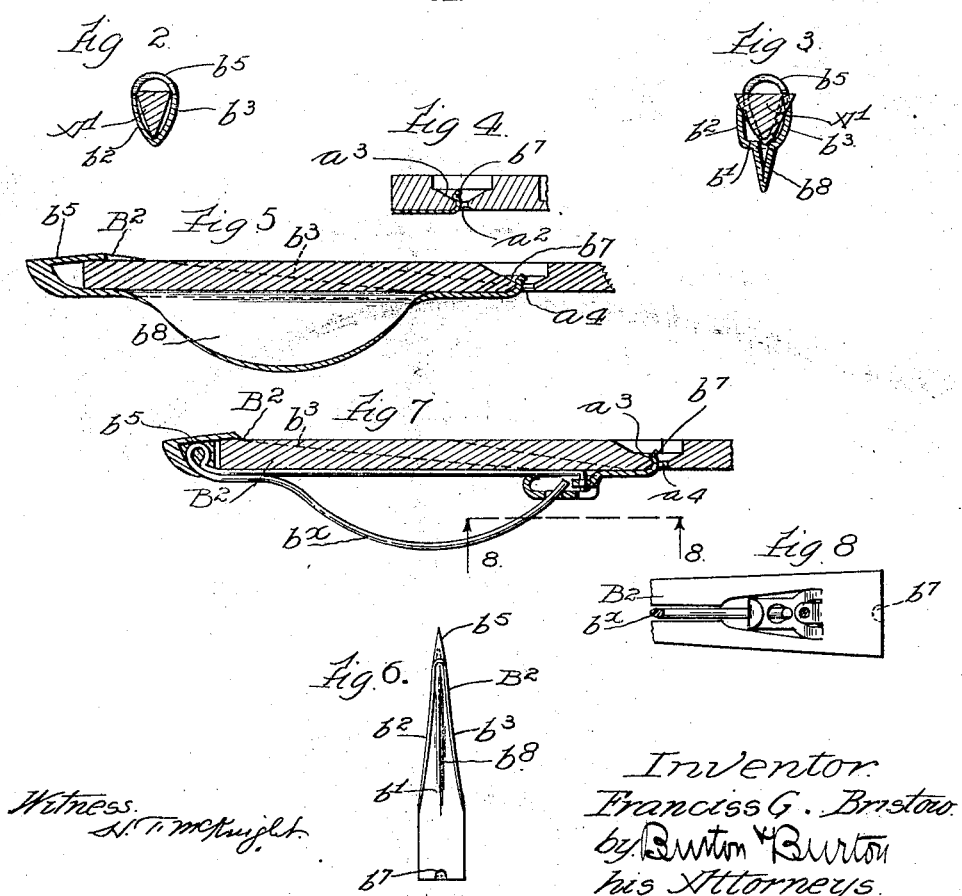
Inventor.
Franciss G. Bristow.
by Burton & Burton
his Attorneys.

Dec. 1, 1925.
F. G. BRISTOW
ADAPTER FOR SHEEP SHEARS
Filed Nov. 1, 1924
1,563,332
2 Sheets-Sheet 2
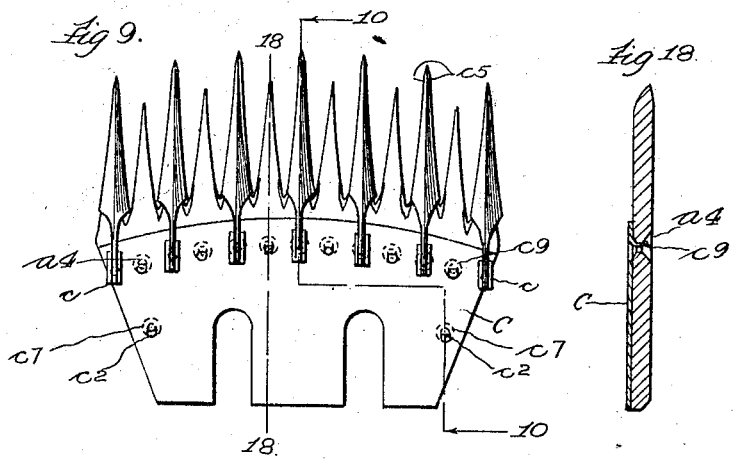
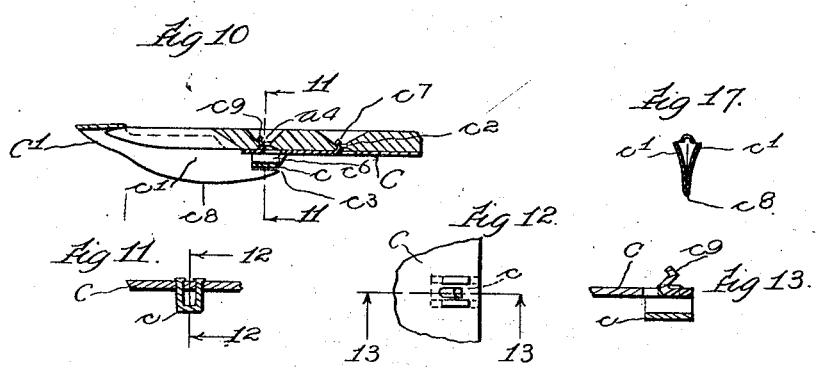
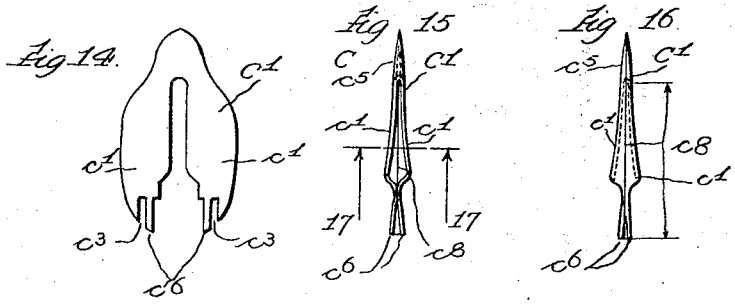
Inventor.
Franciss G. Bristow
by his Attorneys.

Patented Dec. 1, 1925.

1,563,332

UNITED STATES PATENT OFFICE.

FRANCISS G. BRISTOW, OF SYDNEY, AUSTRALIA.

ADAPTER FOR SHEEP SHEARS.

Application filed November 1, 1924. Serial No. 747,170.

*To all whom it may concern:*

Be it known that I, FRANCISS G. BRISTOW, a subject of the King of Great Britain, and a resident of Sydney, Australia, have invented certain new and useful Improvements in Adapters for Sheep Shears, of which the following is a specification, reference being had to the accompanying drawings, forming a part thereof.

The purpose of this invention is to provide a device in the nature of an adapter which may be applied to the comb or fixed cutter of a sheep shear and the like tool for modifying the protrusion or form, or both, of the extreme teeth or fingers of the comb, which may be applied without detaching the comb from the tool or otherwise disassembling the tool, and therefore without material interruption of the use of the shear. It consists in the elements and features of construction shown and described as indicated in the claims.

In the drawings:

Figure 1 is a plan view of the comb of a sheep shear having its extreme teeth at both sides equipped with devices embodying this invention, the device being positioned on one of the extreme teeth and displaced from and shown alongside the other extreme tooth, an intermediate tooth being shown equipped with a device embodying the invention.

Figure 2 is an enlarged detail section at the line, 2—2, on Figure 1 through the displaced device, but showing it as on the tooth.

Figure 3 is an enlarged detail section at the line, 3—3, through the displaced device on Figure 1, but showing it as on the tooth.

Figure 4 is an enlarged detail section at the line, 4—4, on Figure 1.

Figure 5 is an enlarged section at the line, 5—5, on Figure 1.

Figure 6 is a plan view of the adapter seen in section in Figure 5 for an intermediate tooth.

Figure 7 is a view similar to Figure 5 showing a modified form of the rocker-like fin, the same being made of wire instead of integral with the sheet metal of the sheath.

Figure 8 is a detail inverted plan view of a portion of the construction shown in Figure 8 as the same would appear at the section at the line, 8—8, on said Figure 8.

Figure 9 is a plan view of a further modified form of an adapter embodying this invention.

Figure 10 is a section at the line, 10—10, on Figure 9.

Figure 11 is a section at the line, 11—11, on Figure 10.

Figure 12 is a section at the line, 12—12, on Figure 11.

Figure 13 is a section at the line, 13—13, on Figure 12.

Figure 14 is a plan view of the blank from which the adapter shown in Figures 9 and 10 is made by folding.

Figure 15 is a top plan view of the completed adapter tooth.

Figure 16 is an inverted plan of the same.

Figure 17 is a section at the line, 17—17, on Figure 15.

Figure 18 is a section at the line, 18—18, on Figure 9.

In the drawings, A, indicates the comb plate to which the devices of the invention are to be applied. $A^1$, $A^1$, are the extreme teeth of the comb. B, $B^1$, are sheaths or adapter devices constructed to be applied to the extreme teeth of the comb, the sheath, B, being shown so applied on one of said extreme teeth in Fig. 1, for the purpose primarily of elongating the tooth, and in the case of the sheath in the form which is shown at $B^1$, displaced from the comb in Figure 1 of extending the tooth outwardly for increasing the range of engagement of the comb with the wool in the operation of shearing and in all cases for the purpose of maintaining the effective depth of the tooth unreduced by the grinding of the comb for restoring shear edges to all the teeth. The sheaths B, $B^1$, differ only in that the sheath, B, does not have, and the sheath, $B^1$, does have, its terminal deflected outwardly increasing the range of engagement of the comb with the wool in shearing. The following description applies equally to both forms of sheath. The sheath is made of sheet metal stamping comprising a channel portion, $b^1$, with marginal flanges, $b^2$, $b^3$, less in width than the minimum thickness or depth of the tooth, so that the flanges do not project into the plane of the shear edges of the teeth. These flanges unite at the forward extremity of the sheath in the pocket or hood, $b^5$, into which the extremity of the comb tooth projects when the sheath is mounted on the comb, either for elongating the tooth or changing its form. The lateral flanges, $b^2$, $b^3$, taper narrowing from the hood or pocket back toward the rear end and terminate merging in the bottom web of the channel at a point corresponding approximately to the root or base of the comb tooth to which the device is to be applied, as may be understood from Fig. 1. The sheath has desirably, also, a thin fin or rocker-like runner, $b^8$, projecting as a flange from its back or underside in the plane of the dimension above referred to as the thickness of the comb tooth, and extending substantially the entire length of the cutting edge of the tool and it may be somewhat beyond the cutting edge at the rear, this fin or rocker being tapered narrowing in the dimension referred to as the thickness of the comb tooth toward both the forward and the rear end, and most desirably, as shown, having its edge curved convexly throughout the entire length, so that it is adapted to serve as a rocker on which the shear may be tilted in fore-and-aft plane for varying the closeness of the cut and the length of the stubble, or otherwise accommodating the tool to the conditions of the work. In Figure 7 there is shown a modified form of the sheath in which this fin is substituted by a wire member, $b^x$, engaged at front and rear ends in the sheet metal of the sheath and intermediately curved as described with respect to the edge of the unitary or integral fin, $b^8$.

It will be understood that the sheath is applied to the comb tooth from the under or outer side of the latter with a slight rearward movement to engage the end of the tooth. For co-operating with the engagement of the end of the tooth in the hood to securely hold the tooth in place, there is formed at the rear inner corner of the web of the sheath a small tooth, $b^6$, projecting upwardly, that is, toward the plane of the comb and inclined or bent over inwardly so as to slightly overhang the said bottom web of the sheath, and reflexed as seen at $b^7$ so as to be snapped into a hole, $a^2$, which is made in the comb-plate, and which, considered as formed from the under side of the plate, may be described as "under-cut," the practical means of forming this hole so as to be thus undercut being to counterbore it from the upper side of the comb plate so as to leave a slight marginal lip seen at $a^3$ at the under side end of the hole. This hole is positioned with respect to the lateral edge of the comb plate so that when the sheath is applied as described to the outer tooth of the comb with the end of the tooth properly engaged in the terminal pocket of the sheath, the tooth, $b^6$, will register with and may be snapped into the hole, $a^2$, and thereby engage the sheath with the plate securely against disengagement by any stress to which the sheath would be liable in the operation of the comb in shearing.

At $B^2$ there is shown a sheath of the same general character as B and $B^1$ but designed for application to an intermediate tooth, adapted to be used with advantage in case of an ordinarily wide comb to give to such intermediate tooth the proper depth for limiting the closeness of the clip which will be unaffected by the grinding of the comb, which reduces the depth of the tooth. This sheath, $B^2$, is identical in construction with the sheaths, B and $B^1$, as to the channel formation with lateral flanges, $b^1$, $b^2$, and as to the pocket, $b^5$, at the forward end for engagement with the forward end of the tooth. At the rear end of the bottom web of the sheath, $B^2$, there is formed a tooth, $b^7$, similar to the tooth, $b^6$, of the other sheaths, but overhanging forwardly instead of laterally for snapping into a hole, $a^4$, which is made in the comb plate in line with the middle longitudinal line of the tooth to which the sheath is applied. This sheath is applied in the same manner as described with respect to the sheaths, B and $B^1$; and for the purpose of adapting the comb to receive such an auxiliary sheath the comb plate has in line with the middle longitudinal line of each tooth a hole, $a^4$, for engagement of the snap tooth of a sheath such as shown applied to the intermediate tooth of the comb in Figure 1.

It should be understood that these adapter sheaths are made in a sufficient variety of forms as to the length and outward curvature of the terminal hood, and both with and without the outwardly curved terminal, to adapt the shear to the best performance in all the varying conditions existing in different sheep to be sheared. And in view of the contemplated employment of these adapters in their variety it is preferable to make the comb plate originally with the outermost teeth truncated, or without the terminal point and terminated abruptly, as seen in the right hand tooth in Figure 1 so that any desired form of terminal may be given by selecting and applying the proper sheath from the entire set with which the operator will be supplied; and the shear is thereby rendered almost instantaneously adaptable to the varying conditions encountered in the sheep coming successively under the operator's hand.

In Figures 9 and 10 there is shown a desirable form of this invention slightly different from the forms above described. In this form there is shown an adapter plate, C, having mounted upon its under side rectangular staples, $c$, arranged in an arc parallel to and a little back of the forward edge of the plate, C, these staples being adapted to receive and hold rigid with the plate adapter teeth for as many of the comb teeth as it may be desired to equip with such adapter teeth; as illustrated the extreme teeth and alternate intermediate teeth are shown thus equipped. The adapter teeth in this form are made from a sheet steel blank, $C^1$, of the form shown in Figure 11, folded to form the sheath terminal or hood, $c^5$, identical with the corresponding feature, $b^5$, in the preceding forms, the two wings, $c^1$, $c^1$, of the blank being welded together at the lateral edges which coincide when folded to form the riding edge of the fin or runner, $c^8$, of the adapter tooth, the said wings being slightly spaced apart at their rear ends above the welded portion of the edge and notched as seen at $c^3$, to form spring fingers, $c^6$, at the spaced apart portion, these fingers being dimensioned for entering and fitting tightly by their elastic reaction in the staples, $c$; whereby the adapter teeth are held effectively rigid with the plate, C, when the plate is applied to the comb with the hoods of the adapter teeth engaged with the points of the comb teeth as in all the constructions shown. The plate, C, is provided with at least two snap teeth, $c^7$, identical with the snap tooth, $b^7$, of the form shown in the preceding figures, and the comb plate has two apertures, $c^2$, counterbored as described with respect to the apertures, $a^2$, and $a^4$, of the preceding figures, for rendering them undercut for receiving and engaging the two snap teeth of the plate, C. It will be understood that the adapter comprising the plate C, and the adapter teeth mounted thereon as described, is applied to the comb by engaging the points of the comb teeth in the hoods of the adapter teeth and snapping the snap teeth, $c^7$, into engagement with the undercut holes, $c^2$; but it is desirable that the plates be held to the comb plate independently of the engagement of the hoods of the adapter teeth with the ends of the comb teeth, and for that purpose the plate has struck out from it slightly reflexed teeth, $C^9$, in position to engage holes, $a^4$, of the comb plate in alignment with the comb teeth respectively.

I claim:—

1. In combination with a comb and fixed cutter of a sheep shear and the like, a detachable prolongation for a tooth of the comb, consisting of a sheath having at the forward end a pocket for engaging the end of the comb tooth and at the rear end a tooth projecting upwardly with respect to the bottom web of the sheath, the comb plate having an aperture back of the base or root of the comb tooth positioned for engagement by said tooth of the sheath to retain the latter against movement in the direction for disengaging the sheath pocket from the tooth end.

2. In the construction defined in claim 1, foregoing, the hole in the comb plate being undercut to form at its lower margin an engaging edge and the tooth of the sheath for engaging said hole being overhung and terminally sloped for snap engagement with the undercut edge of the hole.

3. The construction defined in claim 1 adapted to be applied to the outermost tooth of the shear comb having for that purpose a lateral marginal flange at the forward portion extending from the pocket substantially the length of the comb tooth and having the tooth of the web for engaging the comb plate projecting from the inner edge of the web and leaning outwardly for overhanging the web, the hole in the comb plate for engagement of said tooth of the sheath being positioned with respect to the lateral edge of the comb for causing said sheath tooth when engaged with the hole to hold the sheath with its lateral flange stopped against the outer edge of the comb tooth.

4. In combination with a comb and fixed cutter of a sheep shear and the like, a detachable prolongation for a tooth of the comb consisting of a sheath having at the forward end a pocket for engaging the end of the comb tooth and at the rear end means for engaging the comb plate, and having a relatively thin longitudinally extended projection from its underside for spacing the plane of the shearing face of the comb from the skin of the animal in shearing.

5. In the construction defined in claim 6, foregoing, the longitudinal extending projection from the shear being convexly curved longitudinally, rendering it rocker-like for accommodating the tilting of the shear to vary the closeness of the cut and length of the stubble.

6. A comb and fixed cutter for a sheep shear and the like having in longitudinal alignment with its several teeth holes for engagement of adapters.

7. A comb and fixed cutter for a sheep shear having the outermost teeth short and terminating abruptly and having toward the rear edge a short distance inward from each outer edge a hole for engagement of an adapter for completing the short tooth.

8. An adapter for the comb plate of a sheep shear and the like, comprising a plate adapted to be applied to the back side of the comb, and adapter teeth each having at its forward end a pocket or hood for engaging the end of a comb tooth and at its rear end adapted to be engaged with the plate, the plate having means for such engagement, the plate and means for disengageably engaging the adapter plate with the comb plate back of the adapted teeth.

In testimony whereof, I have hereunto set my hand this 14th day of August, 1924.

FRANCISS G. BRISTOW.